Jan. 4, 1938.                F. J. GROVEN                2,104,420
                            ELECTRIC SWITCH
                        Filed Sept. 30, 1931            2 Sheets-Sheet 1

INVENTOR.
F. J. Groven.
BY
ATTORNEY.

Jan. 4, 1938.  F. J. GROVEN  2,104,420
ELECTRIC SWITCH
Filed Sept. 30, 1931   2 Sheets-Sheet 2
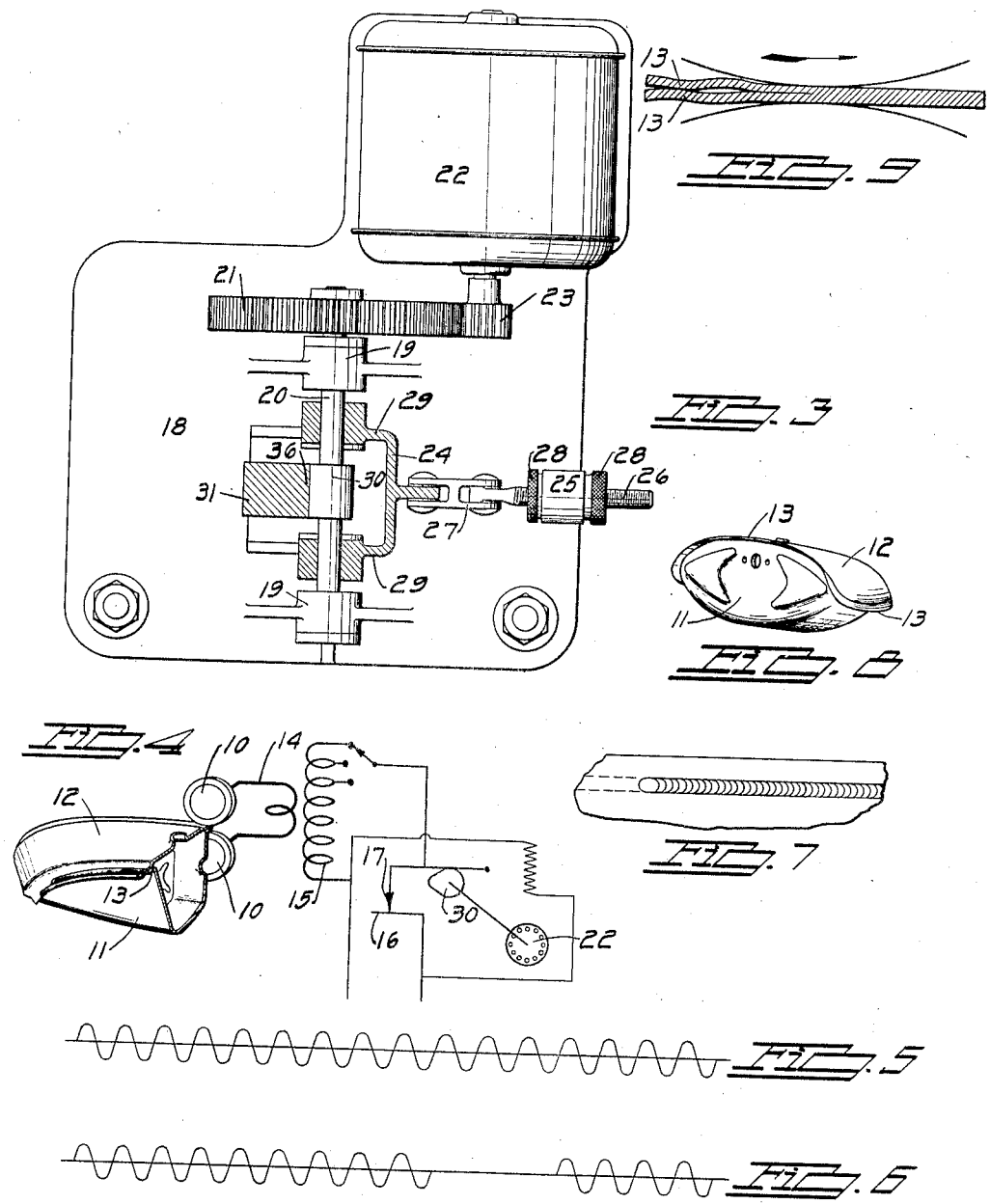

Patented Jan. 4, 1938

2,104,420

UNITED STATES PATENT OFFICE 2,104,420

ELECTRIC SWITCH

Fredrick J. Groven, Highland Park, Mich., assignor to Ford Motor Company, Dearborn, Mich., a corporation of Delaware Application September 30, 1931, Serial No. 566,070

5 Claims. (Cl. 200—91)

The object of my invention is to provide an electric switch for operating a welding machine, which machine is especially adapted for welding sheet metal plates together to accomplish what is ordinarily known as "seam welding". The usual device for producing seam welding consists of a pair of electrode rollers through which a high ampere low voltage current is passed, the sheets of metal to be welded being fed between these revolving rollers and the current being so regulated that the duration of contact of the sheet metal with the rollers is just sufficient to cause the two sheets of metal to be welded together. A direct continuous flow of current is not especially suitable for seam welding, it being more advisable to supply a discontinuous current or one having about a hundred and fifty current impulses a minute so that a series of overlapping spot welds form the "seams".

This method of seam welding with interrupted current solves the major difficulties encountered in seam welding, however, the production of such interrupted current has inherent difficulties which the applicant's device overcomes in a novel manner. As is well known, an extremely high amperage low voltage current is desirable for electric resistance welding, and in this machine a current of 16000 amperes at 3 volts' pressure is impressed upon the electrode rollers. To provide a continuous current having such characteristics is a comparatively simple matter as a conventional welding transformer will produce such an output. A transformer for such service requires a 440 volt primary current with a primary amperage of approximately 125 amperes, the inefficiency and voltage drop of the transformer resulting in the difference between the input watts and the output watts.

If now it is desired to produce an interrupted current of such characteristics as is required with the overlapping spot weld method of welding, then either the primary or secondary circuit must be alternately opened and closed to produce this result. It will readily be seen that interrupting a current of 16000 amperes is commercially impossible in a small sized machine because of the difficulty in producing contact surfaces of large enough area to carry this enormous current. The interrupting of the primary current transformer, being only 125 amperes, can be accomplished with ordinary sized contact points but the voltage of approximately 400 volts causes destructive arcing to occur between these points which burns the points rapidly so as to require replacement after about 30 hours' use.

The novel device provided by the applicant consists of a pair of contact points opened and closed in synchronism with the frequency of the alternating supply current, the device being so accurately timed that the break in the current occurs substantially at the zero point in the cycle. A feature of great importance in connection with this device is the delicate adjusting means by which a fine timing adjustment may be readily obtained to exactly time the breaking of the contact points in synchronism with the zero of the cycle. Thus, none or very little arcing occurs when the points break so that a long life results from this installation.

Aside from the better weld produced by my welding machine, a further object of my invention is to reduce the cost of such welds by eliminating, first the replacement cost of the contact points which formerly amounted to about $1.25 per day for each welding machine; together with the cost of compressed air required to keep these contact points cool and to extinguish the arc drawn by these contacts.

With these and other objects in view, my invention consists in the arrangement, construction and combination of the various parts of my improved device, as described in the specification, claimed in my claims, and illustrated in the accompanying drawings, in which:

Figure 3 shows a cross sectional view, taken on the line 3—3 of Figure 2.

Figure 4 shows a schematic wiring diagram of my welding machine, the tank being welded being shown in section to better illustrate the operation of the machine.

Figure 5 shows an oscillograph record of the continuous alternating line current.

Figure 6 shows a similar oscillograph record of the interrupted current supplied to the primary circuit of my transformer, illustrating the relative duration of the current to the time during which the circuit is broken.

Figure 7 shows a section of sheet metal having been seam welded by my improved device.

Figure 8 shows a perspective view of a welded gas tank, illustrating the curved flanges thereon, to better picture the difficulties encountered in drawing the flanges so that they are exactly complementary to each other, and Figure 9 shows a sectional view through the flanges of the tank, shown in Figure 8, illustrating the irregularities encountered in welding.

Figure 1:
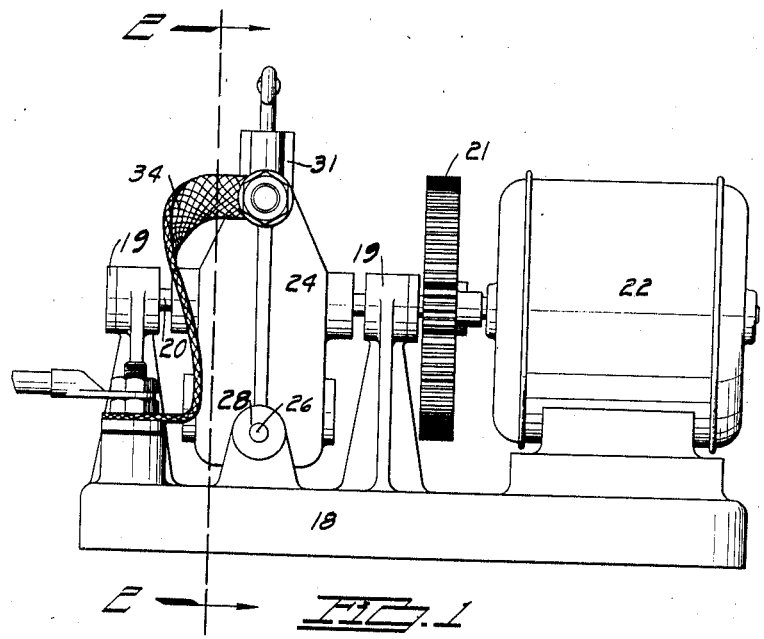
Figure 1 shows a side elevation of my improved electric switch.

Referring to the accompanying drawings, I have used the reference numeral 10 to indicate generally a pair of welding electrical rollers which are driven through a conventional rotating mechanism. Inasmuch as this mechanism forms no part of my invention and as any means for driving the rollers will accomplish the purpose desired the detailed construction will not be described. The article especially adapted to be welded by my machine consists of a tank having a drawn bottom member 11 and a drawn top member 12, the edges of the top member being curved downwardly to provide the cowl of an automobile. Peripheral flanges 13 are stamped from the material of the top and bottom members, which flanges extend all the way around the tank and which are desired to be seam welded together to form a leak-proof container. It will be noted that the flanges 13 do not lie in a flat plane but rather, referring to Figure 8, the flanges form a curved path around the periphery of the tank. During the drawing of such flanges slight irregularities, as shown in Figure 9, occur so when these flanges are placed together they touch only in spots. A pair of these flanges are fed between the rollers 10, so these rollers must be urged together with a relatively high pressure in order to flatten out a path for the seam weld to be made.

Figure 2:
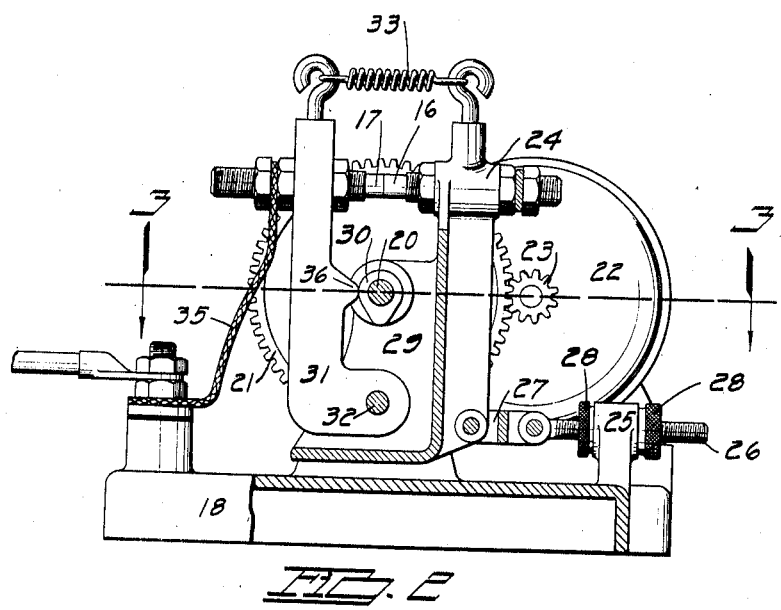
Figure 2 shows a cross sectional view, taken on the line 2—2 of Figure 1.

The secondary winding 14 of a conventional welding transformer electrically connects the two rollers 10 and a primary winding 15 is connected through a stationary and a movable contact point 16 and 17, respectively, with the line current. These contact points are the main elements of my interrupter which is described more fully by Figures 1, 2 and 3. This interrupter consists of a base member 18 having a pair of trunnions 19 extending upwardly therefrom, in which trunnions a shaft 20 is rotatably mounted, this shaft having a gear 21 fixedly secured to one end thereof. A synchronous motor 22 is mounted upon the base plate 18 and operates a pinion 23 which is in mesh with the gear 21. Conventional 60 cycle alternating current operates the motor 22 at exactly 900 R. P. M. which, due to the six-to-one reduction between the pinion 23 and the gear 21, drives the shaft 20 at exactly 150 R. P. M.

I have provided a rocker arm 24, rotatably mounted upon the shaft 20 so as to permit an oscillating movement thereof around the axis of the shaft. An ear 25 projects upwardly from the base plate 18 and a screw 26 is reciprocally mounted in this ear, this screw having a link 27 connecting the forward end thereof with the lower portion of the rocker arm 24. Thus reciprocating the screw 26 through the ear 25 rocks the arm 24 around the axis of the shaft 20. A pair of hand nuts 28 threaded on the screw 26, one on each side of the ear 25, may be manipulated so that a very fine adjustment of the position of the rocker arm may be readily obtained.

It will be noted that the rocker arm 24 is formed with a pair of spaced ribs 29 and a cam 30 is secured to the shaft 20 between these ribs. A breaker arm 31 is pivotally mounted at 32 between the ribs 29 at a point axially spaced from the cam 30, which breaker arm is provided with a cam follower 36 which bears against the cam 30. Thus, when the shaft 20 is rotated the rocker arm 24 remains stationary while the breaker arm 31 oscillates around the pivot 32, due to the action of the cam 30 against the cam follower 36. The contact points 16 and 17 are adjustably secured to the ends of the arm 24 and 31, respectively, and a tension spring 33 is connected across the outer ends of each of these arms to urge the contact points together. Thus, rotation of the shaft 20 causes the points to open and close in exact synchronism therewith. Flexible lead wires 34 and 35 are connected to the contact points 16 and 17, respectively, so that current can conveniently be conducted to these points. In order that the points may be insulated from each other the arm 31 is formed from a bakelite impregnated material, although other means for insulating these points may be used if desired.

Due to the fact that the contact points 16 and 17 open and close 150 times a minute and that the 60 cycle current is generated at 3600 cycles per minute, it will be seen that 24 cycles of current will flow during one cycle of the contact points. I recommend the adjusting of my contact points 17 so that the points are held open during about ¼ of their cycle.

It is, of course, essential for the correct functioning of the device that the contact points are opened exactly, or at least very close to the zero period of the alternating current cycle. Inasmuch as 24 of these cycles occur during one revolution of the shaft 20 and as one cycle has two zero voltage periods with two periods of current acceleration and two periods of current decelebration a movement of less than 4 degrees of the rocker 24 is sufficient to advance the timing through the full voltage range. It will therefore be seen that in order to adjust the timing very close to the zero point, a relatively fine adjustment of the contact points around the cam must be made. This is satisfactorily accomplished with my adjusting nuts 28 with which very fine arcuate adjustment of both the rocker arms and breaker arm around the shaft is readily obtained. The synchronous motor 22 is, of course, connected across the main supply current and inasmuch as such motors remain in exact synchronism with the voltage supplied to the transformer it follows that the breaking of the contact points must also occur very close to the zero point of the cycle when the device is once adjusted.

The operation of my improved device consists in feeding the sheets of metal to be welded between the electrode rollers, with the welding transformer and contact points 16 and 17 and the motor 22 being in operation. A relatively heavy pressure is applied by the rollers from which it will be seen that irregularities in the material to be welded will be ironed out thereby. As each surge of current is impressed upon the rollers the material therebetween is almost instantly melted so as to be welded but just before the molten material has time to flash out the current is broken by the contact points opening allowing the rollers to advance a short distance up upon a new portion of the sheet where another spot weld is produced. These welds overlap, as shown in Figure 7, whereby a continuous seam weld is provided.

Among the many advantages arising from the use of my improved device it may be well to remember that a negligible arcing of the contact occurs to require practically no replacement thereof. Still a further advantage results in that the costly provision of a jet of compressed air blowing against each contact point is dispensed with and still the life of these points is increased many many times over the life of a non-synchronized interrupter. My simple rocker arm whereby a very fine adjustment of the timing is obtained forms an important feature in connection with this device and one which it is believed is essential to produce the results obtained. Still a further advantage resulting from the use of my improved device arises because the gap of the contact points may be so adjusted that both the opening and closing of the points will occur at zero voltage so that heavy rushes of current through the transformer when the points close will be eliminated. This results in less fluctuation in the line circuit.

Some changes may be made in the arrangement, construction and combination of the various parts of my improved device without departing from the spirit of my invention, and it is my intention to cover by my claims such changes as may reasonably be included within the scope thereof.

I claim as my invention:

1. An interrupter adapted to intermittently break an alternating electrical circuit through a welding transformer comprising, a frame, a cam rotatably mounted in said frame, said cam being mechanically rotated by a synchronous motor and said motor being electrically driven by the current source which energizes said welding transformer, a bracket pivotally mounted upon said frame in position to rotate around the axis of said cam, contact points completing said electric circuit and supported upon said bracket in position to be separated upon rotation of said cam relative to said bracket to thereby break said circuit, and a relatively stationary adjusting device adapted to oscillate said bracket and contact points around said cam whereby the opening of said contact points may be adjusted to occur at zero voltage of the supply current cycle.

2. A device, as claimed in claim 1, wherein said cam is gear driven by said motor at a reduced speed, the frequency of said supply current being an exact multiple of said gear reduction ratio.

3. A device, as claimed in claim 1, wherein said adjusting device comprises a micrometer screw which is fastened in said frame, the free end of which anchors said bracket against rotation with said cam.

4. A switch for breaking the primary current of an electrical circuit through a welding transformer comprising, a frame, a cam rotatably mounted in said frame, said cam being mechanically driven by a synchronous motor and said motor being electrically driven by the current which energizes said transformer, an arm rotatably mounted upon said frame in substantial axial alignment with said cam, means for rotatably adjusting said arm, a second arm rotatably mounted upon said first mentioned arm at a point spaced radially from the axis of said first arm, coacting contact points secured to the respective arms at points diametrically opposite their pivotal connections with each other, said last mentioned arm having a detent thereon adapted to coact with said cam so that said contact points will alternately open and close as said cam rotates, and means for partially rotating said first mentioned arm around said cam to thereby adjust the angular position at which the contact points open to exactly coincide with zero voltage in the supply current cycle.

5. A device, as claimed in claim 4, wherein said means for rotatably adjusting said arm comprises a micrometer screw which extends between said arm and frame.

FREDRICK J. GROVEN.